July 20, 1926.
J. V. GIESLER ET AL
1,593,170
SAFETY TEMPERATURE REGULATOR
Filed March 4, 1926
2 Sheets-Sheet 1
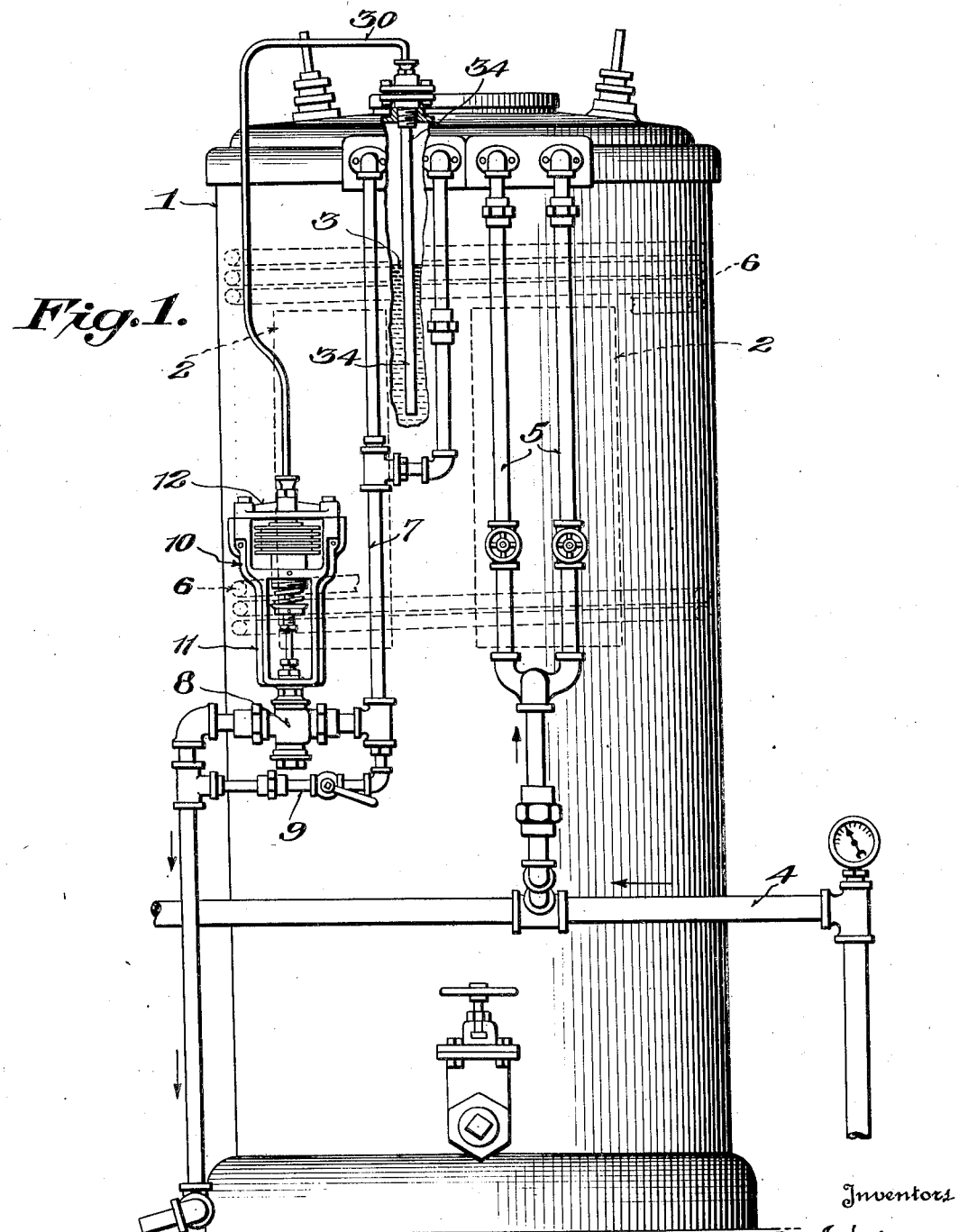

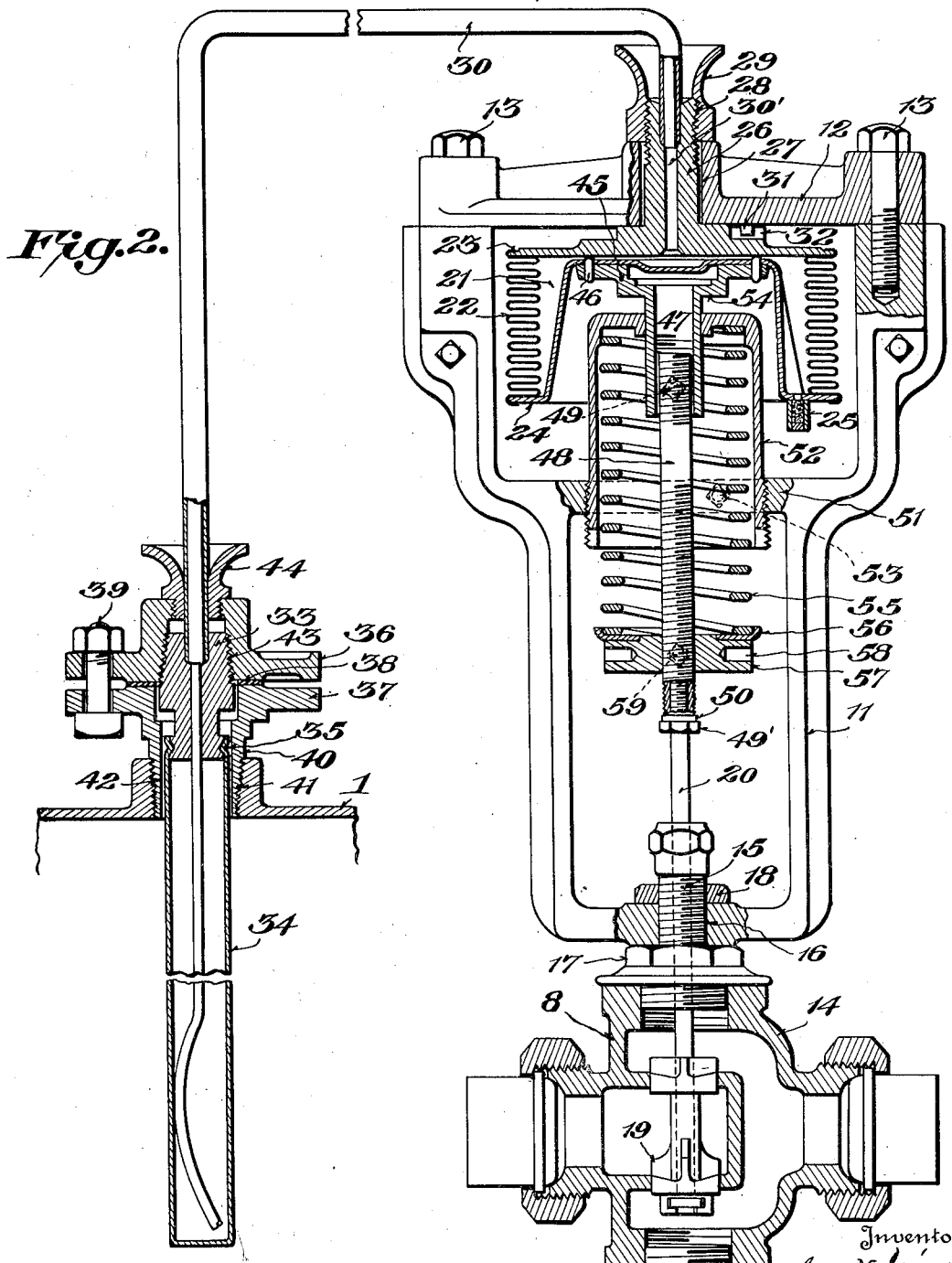

Patented July 20, 1926.

1,593,170

UNITED STATES PATENT OFFICE.

JEAN V. GIESLER AND WILLIAM W. CARSON, JR., OF KNOXVILLE, TENNESSEE, ASSIGNORS TO THE FULTON COMPANY, OF KNOXVILLE, TENNESSEE, A CORPORATION OF MAINE.

SAFETY TEMPERATURE REGULATOR.

Application filed March 4, 1926. Serial No. 92,333.

This invention relates to improvements in safety temperature regulators for transformers of the type which are cooled by the circulation of a suitable cooling medium, such as water.

Devices heretofore used for regulating the temperature of such transformers have included a control valve positioned in the supply line of the cooling liquid and controlled by a thermostatic element which is regulated by the temperature of the insulating medium. These devices are satisfactory for ordinary operation but in case of damage to the thermostatic element the valves will normally close, thereby cutting off the supply of cooling liquid. As a result, the transformer will overheat and serious damage will be caused. For this reason it is necessary to provide special alarm systems which are adapted to operate on overheating of the transformer.

It is an object of this invention to provide a device which is so constructed that the valve will be maintained in an open position in case of any damage to the thermostatic element, thereby obviating the necessity of providing such alarm systems.

It is a further object of this invention to provide a thermosensitive control device of rugged construction, simple and economical of manufacture, and possessing certain material advantages of construction which facilitate assembly, adjustment and operation of the device by inexperienced and unskilled personnel, etc.

One embodiment of the inventive idea is illustrated in the accompanying drawings, wherein, Fig. 1 is a diagrammatic view showing the device applied to a transformer; and Fig. 2 is a detail in section of the thermostatic control device.

Referring to the drawings, wherein like reference characters refer to like parts, 1 is a transformer of any known type having windings 2 surrounded by a suitable insulating medium 3, such as heavy oil. The circulation of the cooling liquid is provided for by means of an inlet pipe 4, pipes 5 connected with cooling coils 6, and a discharge pipe 7 passing through a control valve 8. A by-pass 9 around said control valve may be provided where desired.

A thermostatic control device 10, including a frame 11 having a cap or head 12 attached thereto by means of bolts 13 (Fig. 2), is supported on the valve body 14, preferably positioned in the discharge side of the supply line, by means of a threaded extension 15 passing through an opening 16 in the lower portion of the frame 11. Said frame rests on a valve bonnet 17 and is secured in position by means of a lock nut 18. The valve 19 has a valve stem 20 extending upwardly through said extension 15.

A collapsible and extensible vessel 21 is mounted in the frame 11 by means hereinafter described, and includes a collapsible and extensible wall 22 having opposite end walls 23 and 24 secured thereto, as by means of soldering, so as to form fluid-tight joints. A filling plug 25 is provided for inserting liquid into the interior of the vessel 21.

For the purpose of providing a simple and convenient means of assembly and adjustment of the device, the upper end wall 23 is supported on the cap 12 by means of an extension 26, passing through an opening 27 in said cap, and having at the outer end thereof a threaded portion 28 which is engaged by a flared nut 29. One end of a small tube 30 passes through the nut 29 and is secured to the extension 26, preferably by means of soldering, said tube connecting with a passage 30′ in said extension which leads into the vessel 21. The flared portion of the nut 29 prevents the tube from being bent at a sharp angle. The end wall 23 is prevented from rotating in its support by means of a projection 31 on the cap 12 which engages with a slot 32 in said end wall.

The other end of tube 30 is secured, as by means of soldering, to a bulb-head 33 and extends therethrough into a bulb 34, which is positioned in contact with the insulating medium 3 of the transformer (Fig. 1). The bulb 34 is attached at 35 to bulb-head 33 so as to form a fluid-tight joint, preferably by soldering. Means are provided for supporting said bulb in the casing 1 of the transformer which, as herein, shown, include two flanged members 36 and 37 having a gasket 38 therebetween and being held rigidly together by means of a plurality of bolts 39. The lower flanged member 37 has an extension 40 having a threaded engagement 41 with the casing of the transformer. The bulb 34 extends into the transformer through an opening 42 in said member 37, the upper portion of the bulb-head 33 having a threaded engagement 43 with the flanged member 36. A flared nut 44 surrounds the tube 30 and engages the member 36, the flared portion thereof preventing the tube from being bent at a sharp angle. It will be observed that every detail of construction is designed to facilitate to the greatest degree ease of assembly, accessibility of parts, etc. For example, in case the joint 35 between the bulb and bulb-head leaks, the removal of bolts 39 will permit the member 36 and the bulb to be lifted freely out of the casing for repairs. This is obviously a great practical advantage.

To the lower end wall 24 is attached by means of rivets 46 a flanged member 45 having a tubular extension 47 projecting downwardly therefrom. The interior of said extension is threaded to receive one end of a rod 48 which is prevented from turning therein by means of a pin or set screw 49. The other end of the rod 48 is threaded interiorly to receive the upper end of the valve stem 20, the latter being held in a fixed position by means of lock nut 49' and washer 50.

The frame 11 is provided with a suitable member 51 which is threaded to receive an inverted spring cup 52 surrounding the rod 48, which may be held in a fixed position by means of a set screw 53. The upper end of the spring cup 52 limits the motion of the valve 19 by engagement with the shoulder 54 of the flanged member 45, and may be adjusted by means of its threaded engagement with member 51 to vary the amount of travel of the valve. The upper end of a spring 55 bears in said spring cup, the lower end thereof bearing against a spring pad 56 carried on a nut 57 which is threaded on the rod 48. The nut 57 is preferably provided with holes 58 for ready adjustment, and is held in position by a set screw 59.

It will be observed that if it is desired to remove the thermostat for any purpose such as repair or replacement, bolts 13 which secure the cap 12 to the frame and bolts 39 which secure the flanged members 36 and 37 together, may be removed, valve stem 20 disengaged from rod 48, and nut 57 removed from rod 48. The assembly of vessel 21, flexible tube 30, and bulb 34 may then be removed from its supporting means without disturbing the connections between the tube 30, bulb-head 33, and extension 26. Conversely, the assembly of the apparatus is an equally simple and obvious operation for any person, however unacquainted with such equipment. At the same time the apparatus is rigidly held in position and vessel 21 is prevented from turning and working loose by the engagement of projection 31 in slot 32.

During the construction of the apparatus a suitable volatile liquid is inserted through the filling plug 25, filling the vessel 21, tube 30 and partially filling the bulb 34. The filling plug is then sealed in any suitable manner. The liquid used must be such that at the temperature at which operation of valve 19 is desired its vapor pressure is somewhat less than atmospheric pressure. In other words, at the operating temperature there should be a partial vacuum within the vessel 21 and likewise in bulb 34, since the pressure is equalized through tube 30. With the bulb 34 at the operating temperature the adjusting nut 57 is then tightened against spring 55 sufficiently to overcome the effect of the partial vacuum within the vessel 21 and to pull movable end wall 24 downward slightly, causing valve 19 to move toward the open position. It will thus be seen that with an increase of temperature at bulb 34 and the resultant increase in vapor pressure that the vacuum within vessel 21 will be lessened. This will allow spring 57 to pull downward on movable end wall 24 and so move valve 19 further toward the open position. Conversely a decrease in temperature at bulb 34 will condense some of the vapor therein, increasing the vacuum within vessel 21 and thus tending to collapse said vessel. The resultant movement causes additional compression of spring 55 and at the same time moves valve 19 toward the closed position. From the foregoing description, it will be seen that with the bulb 34 at the operating temperature the atmospheric pressure exerted on the outside of movable wall 24 is balanced by the spring 55 plus the vapor pressure exerted within the said wall, and it is obvious that should a leak occur in vessel 21 or in any portion of the bulb 34 or the connecting tubing 30, the pressure within vessel 21 will increase until it equals the atmospheric pressure, thus allowing the full force of the spring to be exerted toward opening the valve.

Should the valve become stuck (assuming there is no leakage in the thermostatic unit) by corrosion or accumulation of dirt so that the spring is not strong enough to open it, then an increase in temperature above the desired point at bulb 34 will cause the pressure within chamber 21 to increase. A sufficient rise in temperature at bulb 34 will create a pressure within vessel 21 greater than atmospheric pressure, so that this pressure acting on movable wall 24 will assist spring 55 to open valve 19.

As has been pointed out throughout the specification, the mechanical simplicity of the parts and the details of construction are such that the device can be readily assembled and installed, or disassembled for purposes of repair or replacement, with maximum facility. Moreover, all operating adjustments are simple and obvious. For example, the travel of the valve is limited by the position of the adjustable spring cup; the spring tension may be adjusted by means of nut 57; the position of the valve may be varied by the threaded engagement between valve stem 20, connecting rod 48, and extension 47, etc. These are material advantages of great practical importance.

While only one embodiment of the inventive idea has been illustrated in the accompanying drawings, it is to be understood that these drawings are for the purpose of illustration only and are not to be taken as defining the limits of the invention, reference being had to the appended claims for this purpose.

What is claimed is:—

1. A thermal device for regulating temperatures, including a frame, a collapsible and extensible vessel, a bulb positioned in the medium of which the temperature is to be regulated, a tube connecting said vessel with said bulb, a volatile liquid partially filling said vessel and bulb, the vapor pressure thereof being controlled by the temperature of said medium and being normally less than atmospheric, a valve controlling the flow of a temperature regulating medium, a member operatively connecting said valve with said vessel, a spring cup adjustably mounted on said frame, a nut threaded on said connecting member, and a spring interposed between said cup and said nut thereby tending to open said valve, the tension of said spring being normally less than the atmospheric pressure on said vessel.

2. In a device of the class described, in combination with a transformer and a system for circulating water therethrough, a vessel comprising a collapsible and extensible wall having opposite end walls, a valve in said circulating system having operative engagement with one of said end walls, a frame, a spring mounted on said frame in operative engagement with said vessel and tending to extend the same, a cap for said frame having an opening therein, the other of said end walls having a centrally arranged extension passing through said opening, a nut engaging the outer end of said extension, a tube connected to said extension and associated with an opening therein leading to said vessel, a bulb connected to the other end of said tube and positioned in said transformer, and a volatile liquid partially filling said vessel and bulb.

3. In a device of the class described, in combination with a transformer and a water circulating system, a vessel comprising a collapsible and extensible wall having opposite end walls, a frame, a cap therefor having an opening therein, a centrally arranged extension on one of said end walls passing through said opening, a flared nut engaging the outer portion of said extension, a tube passing through said nut and secured to said extension, said tube connecting with an opening therein leading to said vessel, a bulb, a head for said bulb, the other end of said tube extending through said head into said bulb, means for supporting said bulb on said transformer including a member mounted in the casing of said transformer and having an opening therein, said bulb extending through said opening into said transformer, a second member having an interior threaded engagement with said bulb head, and means for securing said members together, a valve in said circulating system having operative engagement with the other of said end walls, resilient means mounted on said frame and tending to extend said vessel, and a volatile liquid partially filling said vessel and bulb.

4. In a device of the class described, a thermostat, a bulb positioned in the medium to be regulated and connected with said thermostat, a valve operatively connected to the movable wall of said thermostat, means for supporting said thermostat including a frame, a cap for said frame having an opening therein, an extension on the other end wall of said thermostat passing through said opening, a nut engaging the outer end of said extension thereby securing said thermostat to said cap, a projection on said cap engaging a slot in said second-named end wall for preventing the rotation of said thermostat, and resilient means operatively attached to said frame and tending to extend said vessel.

5. In a device of the class described, the combination of a frame, a cap for said frame having an opening therein, a thermostat having opposite end walls, an extension on one of said end walls passing through said opening, a nut engaging the outer portion of said extension, a valve, a member adjustably connecting said valve with said opposite end wall, an inverted spring cup adjustably mounted in said frame and surrounding said connecting member, the upper end of said spring cup being adapted to limit the movement of said second-named end wall, a nut on said connecting member, and a spring interposed between said spring cup and said last-named nut thereby tending to extend said vessel.

In testimony whereof we have signed this specification.

JEAN V. GIESLER.
WILLIAM W. CARSON, Jr.